United States Patent [19]

Voorhees

[11] Patent Number: 5,219,250
[45] Date of Patent: Jun. 15, 1993

[54] CUTTING TOOL FOR PLASTERBOARD

[76] Inventor: Derek W. Voorhees, 60 Forest St., Upton, Mass. 01568

[21] Appl. No.: 674,693

[22] Filed: Mar. 25, 1991

[51] Int. Cl.⁵ .............................................. B23C 5/22
[52] U.S. Cl. ...................................... 407/34; 30/347; 279/91; 407/42; 407/54; 407/63; 408/26; 408/226; 408/227
[58] Field of Search ............... 408/22, 26, 28, 226, 408/227; 411/383, 387, 396, 548; 30/276, 347, 500; 407/34, 40, 42, 54, 57, 61, 63, 120; 279/89-91

[56] References Cited

U.S. PATENT DOCUMENTS

| | | | |
|---|---|---|---|
| 376,009 | 1/1888 | Raynal | 279/91 |
| 458,640 | 9/1891 | Phillips | 408/233 X |
| 862,901 | 6/1907 | Groom | |
| 2,349,741 | 5/1944 | McLaughlin | 279/89 |
| 2,393,424 | 1/1946 | Selch | 279/91 |
| 3,327,749 | 6/1967 | Hunn | 408/22 |
| 4,384,396 | 3/1983 | Smolik | |
| 4,924,578 | 5/1990 | Chagnon et al. | 30/500 |

Primary Examiner—Steven C. Bishop
Attorney, Agent, or Firm—Blodgett & Blodgett

[57] ABSTRACT

A tool for cutting an access hole in plasterboard which is mounted to a wall stud. The tool includes a housing portion, a plug or connector portion and a cutting element such as a screw which has a head and a threaded shank. The housing portion has an exit opening, an interior cavity which forms a seat for the head of the cutting portion and a bore which extends from the exit opening to the cavity. The shank of the screw extends freely through the bore and beyond the exit opening. The plug or connector portion of the tool is threaded into the housing and engages the head of the screw for fixing the screw relative to the housing and includes a shank for insertion into the jaw or chuck of a rotary drive mechanism for rotating the cutting element about its central longitudinal axis.

6 Claims, 1 Drawing Sheet

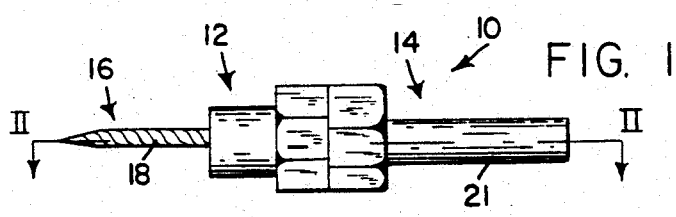
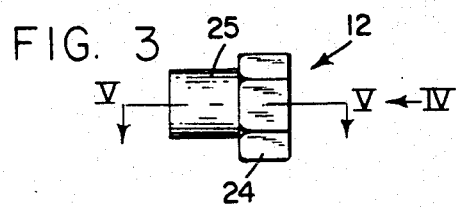
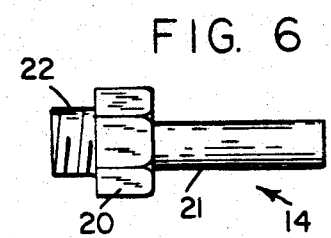
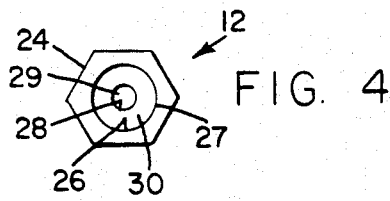
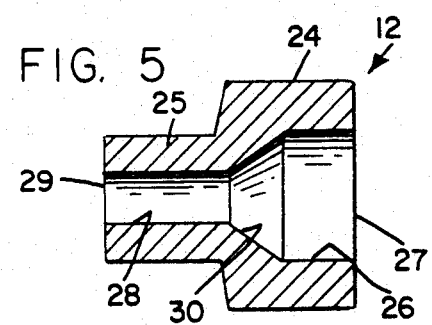
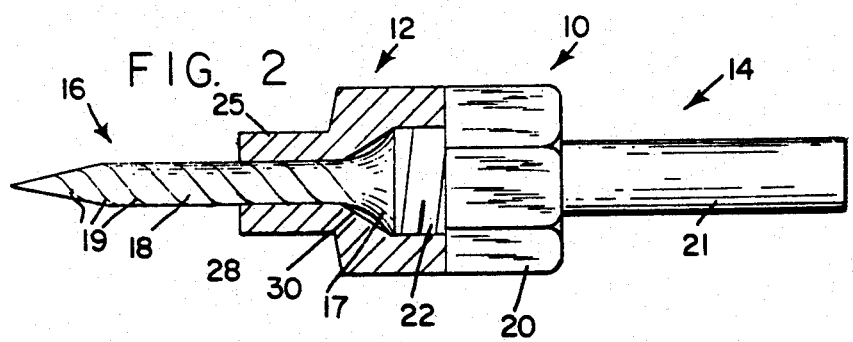
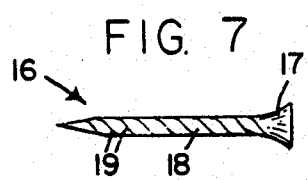

CUTTING TOOL FOR PLASTERBOARD

BACKGROUND OF THE INVENTION

The present invention is generally directed to a tool for cutting an access hole in plasterboard and specifically directed to a tool for cutting an access hole in plasterboard for exposing the front opening of an electrical receptacle box.

During building construction, each electrical box is fixed to a wall stud. Drywall plasterboard is installed by fastening the plasterboard to the wall studs so that it extends over and covers the openings to the electrical boxes. After installation of the plasterboard, a hole must be formed in the plasterboard at the location of each electrical box which corresponds to the front opening of the box. This requires accurate and time-consuming measurements.

Special tools have been developed in recent years for locating each electrical receptacle box which is covered by plasterboard and for cutting an access opening in the plasterboard. The tools which are employed for cutting the access openings also utilize special cutting bits. These specialized tools and bits for cutting plasterboard are expensive and serve no other purpose. In addition, the bits have to be replaced frequently because of the abrasive nature of plasterboard. Therefore, the replacement of cutting bits represents a substantial continuing expense for the operation of providing access holes to the electrical receptacle boxes in the building trade. These and other difficulties experienced with the prior art devices for cutting access holes in plasterboard have been obviated by the present invention.

It is, therefore, a principal object of the invention to provide a cutting tool which can be utilized with exiting powder tools for cutting an access hole in plasterboard.

Another object of this invention is the provision of a cutting tool for cutting an access hole in plasterboard which utilizes a disposable cutting bit.

A further object of the present invention is the provision of a cutting tool for cutting an access hole in plasterboard which utilizes a standard screw as the cutting bit.

It is another object of the present invention to provide a tool for cutting an access hole in plasterboard which is simple in construction, which is inexpensive to manufacture, and which is capable of a long life of useful service with no maintenance.

With these and other objects in view, as will be apparent to those skilled in the art, the invention resides in the combination of parts set forth in the specification and covered by the claims appended hereto.

SUMMARY OF THE INVENTION

In general, the invention consists of a tool for cutting an access hole in plasterboard which is mounted to a wall stud. The tool includes a housing which has an exit opening at one end, a cavity within the housing, and a guide bore which extends from the cavity to the exit opening. A removable cutting element which has a head portion and an elongated cylindrical cutting shank is located within the housing so that the head portion is in the cavity and the shank portion extends through the bore and beyond the exit opening. Another element of the cutting tool releasably fixes the head of the cutting element within the cavity and enables the housing to be operatively connected to a rotary drive mechanism for rotating the cutting element about its central longitudinal axis to enable the cutting element to penetrate plasterboard and to cut a slot in the plasterboard by moving the cutting tool laterally of its central longitudinal axis. More specifically, the removable cutting element is a conventional screw such as that which is employed for fastening plasterboard to wall studs.

BRIEF DESCRIPTION OF THE DRAWINGS

The character of the invention, however, may be best understood by reference to one of its structural forms, as illustrated by the accompanying drawings, in which:

FIG. 1 is a front elevational view of a cutting tool embodying the principals of the present invention, FIG. 2 is a horizontal cross sectional view of the cutting tool taken along the line II—II of FIG. 1 and looking in the direction of the arrows, FIG. 3 is a side elevational view of the housing portion of the cutting tool of the present invention, FIG. 4 is a rear elevational view of the housing portion, looking in the direction of arrow IV of FIG. 3, FIG. 5 is a horizontal cross sectional view of the housing portion, taken along the line V—V of FIG. 3 and looking in the direction of the arrows, FIG. 6 is a side elevational view of a second portion of the cutting tool which is adapted to be combined with the housing of FIG. 3, and FIG. 7 is a side elevational view of the cutting bit portion of the cutting tool of the present invention.

DESCRIPTION OF THE PREFERRED EMBODIMENT

Referring to the drawings, the cutting tool of the present invention is generally indicated by the reference numeral 10 and comprises a housing which is generally indicated by the reference numeral 12, a plug or connecting portion which is generally indicated by the reference numeral 14, and a cutting element which is generally indicated by reference numeral 16. The cutting element 16 has a head portion 17 and an elongated shank portion 18 which is provided with cutting projections 19.

The plug or connecting portion 14 includes a hexagonal outer side surface 20, a threaded shank 22 which extends from one end of the surface 20 and a smooth shank 21 which extends from the opposite end of the surface 20.

The housing 12 comprises a hexagonal outer side surface 24 and a cylindrical shank 25. The housing 12 has an access opening 27 at one end of the housing and an exit opening 29 of the opposite end of the housing. A cavity 30 is located within the center of the housing 12. A cylindrical guide bore 28 extends from the cavity 30 to the exit opening 29. A threaded bore 26 extends from the cavity 30 to the access opening 27. The cavity 30 has a frusto-conical shape wherein the large diameter of the cavity is adjacent the threaded bore 26 and the small diameter of the cavity 30 is adjacent the guide bore 28. The size and shape of the cavity 30 is approximately the same as the head 17 of the cutting element 16 so that when the cutting element 16 is located within the housing 12 as shown in FIG. 2, the head 17 seats snugly within the cavity 30 so that the shank portion 18 of the cutting element extends freely through the guide bore 28 and beyond the opening 29 as illustrated in FIG. 2. The cutting element 16 is fixed firmly within the cavity 30 by the threaded shank 22 when the shank 22 is threaded into the bore 26. The hexagonal surface 20 enables the plug 14 to be tightened by a wrench so that the inner surface of the threaded shank 22 engages the outer end surface of the head 17 and clamps the head 17 within the cavity 30 so that the cutting element 16 is fixed relative to the housing 12. In the preferred embodiment, the cutting element 16 is a conventional screw of the type which is normally used for fastening plasterboard to wooden studs of the wall framework.

The cutting tool 10 of the present invention is utilized by inserting the shank 21 into the jaws or chuck of a rotary drive mechanism such as a drill or a router as the shank 21 is rotated about its central longitudinal axis by the rotary drive mechanism, the cutting element 16 is also rotated about its central longitudinal axis since it is co-axial with the shank 21.

The tool 10 is utilized for cutting an access opening into plasterboard about the outer opening of an electrical receptacle box by, first, forcing the cutting tool against the plasterboard at the opening of the receptacle box so that the tool penetrates the plasterboard. The cutting tool 16 is then moved laterally relative to its central longitudinal axis as the tool 16 rotates. The cutting tool 16 is moved toward one side of the receptacle box which effectively cuts a slot in the plasterboard inwardly from one side of the receptacle box. Thereafter, the cutting element is moved laterally along the outer edge of the receptacle box opening until a complete opening is formed in the plasterboard to expose the entire outer opening of the receptacle box. Although the primary purpose of the cutting tool of present invention is for cutting an access hole in the plasterboard for the electrical receptacle box, the tool of the present invention may be used for cutting openings in plasterboard of any desired shape for any desired purpose. Although special hardened cutting elements may utilized with the present invention the use of conventional screws are preferred since they are readily available and inexpensive. The threads of the screw 16 make ideal cutting edges for plasterboard. As these cutting edges become dull due to the abrasive nature of the plasterboard the screw is easily replaced with a new screw by uncoupling the elements 12 and 14, removing the old screw, inserting a new screw and recoupling the elements 12 and 14.

Clearly, minor changes may be made in the form and construction of the invention without departing from the material spirit thereof. It is not, however, desired to confine invention to the exact form herein shown and described, but it is desired to include all such as property come within the scope claimed.

The invention having thus been described, what is claimed as new and desired to secure by Letters Patent is:

1. A tool for cutting an access hole in plasterboard which is mounted to a wall stud said tool being adapted to hold a conventional screw which has a head and a threaded shank, said tool comprising:
    a) a housing which has an exit opening at one end, a cavity within said housing, and a guide bore which extends from said opening to said cavity, said bore having a central longitudinal axis and being smaller in cross section than said cavity, said cavity being adapted to form a seat for the head of said screw so that the shank of the screw extends freely through said guide bore and beyond said exit opening and is co-axial with said bore, said housing including no cutting edges thereon,
    b) means for releasably fixing the head of said screw within said cavity, and
    c) attaching means for operatively connecting said housing to a rotary drive mechanism for rotating said screw about said central longitudinal axis so that movement of the shank of said screw along said axis toward said plasterboard enables the shank of said screw to penetrate said plasterboard and subsequent movement of said shank laterally of said axis enables said shank to cut a slot in said plasterboard.

2. A tool as recited in claim 1, wherein the means for releasably fixing the head of the screw to said housing comprises:
    a) an access opening in said housing,
    b) a cylindrical threaded bore which extends from said access opening to said cavity and which is axially aligned with said guide bore, and
    c) a plug which has a cylindrical threaded shank which is threaded into said threaded bore for engaging the head of said cutting element and for fixedly clamping said head within said cavity.

3. A tool as recited in claim 1, wherein said cavity has a frusto-conical shape, said cavity having a small diameter end at said guide bore and a large diameter end at said threaded bore to form a snug seat for the head of a screw which has a tapered head.

4. A tool as recited in claim 2, wherein said attaching means comprises an elongated attaching shank which is fixed to said plug and which is axially aligned with said threaded shank.

5. A tool as recited in claim 4, wherein said plug has at least two opposite side surfaces between said attaching shank and said threaded shank and which are parallel with the central longitudinal axis of said threaded shank for enabling said plug to be rotated and tightened by a wrench.

6. A tool as recited in claim 2, wherein said plug has at least two opposite side surfaces which are located outside of said threaded bore and which are parallel with the central longitudinal axis of said threaded shank for enabling said plug to be rotated and tightened by a wrench.

* * * * *